United States Patent [19]

Menzel

[11] Patent Number: 5,074,943
[45] Date of Patent: Dec. 24, 1991

[54] SLIP CONTROL FOR HELICALLY WOUND PIPES

[75] Inventor: Stanley W. O. Menzel, Burnside, Australia

[73] Assignee: Rib Loc Australia Pty. Ltd., Australia

[21] Appl. No.: 466,277

[22] PCT Filed: Aug. 19, 1988

[86] PCT No.: PCT/AU88/00311

§ 371 Date: Feb. 16, 1990

§ 102(e) Date: Feb. 16, 1990

[87] PCT Pub. No.: WO89/01588

PCT Pub. Date: Feb. 23, 1989

[30] Foreign Application Priority Data

Aug. 19, 1987 [AU] Australia .................... PI3830

[51] Int. Cl.$^5$ .................................... B29C 63/32
[52] U.S. Cl. ........................ 156/195; 138/154; 156/247; 156/248; 156/294; 156/584
[58] Field of Search ............. 156/187, 188, 195, 247, 156/248, 344, 584; 206/616, 617; 138/122, 129, 144, 150, 154, DIG. 8

[56] References Cited

U.S. PATENT DOCUMENTS

| | | | |
|---|---|---|---|
| 642,515 | 1/1900 | Boutillier | 138/144 |
| 2,227,869 | 1/1941 | Thiemer et al. | 140/60 |
| 2,695,255 | 11/1954 | Avery | 156/294 |
| 2,960,425 | 11/1960 | Sherman | 156/187 |
| 3,020,615 | 2/1962 | Peters | 138/129 |
| 3,076,588 | 2/1963 | Conway et al. | 156/247 |
| 3,153,506 | 10/1964 | Pottle | 206/617 |
| 3,607,517 | 9/1971 | Pelley | 156/195 |
| 3,616,819 | 11/1971 | Dunlap et al. | 156/188 |
| 4,009,063 | 2/1977 | Wood | 156/294 |
| 4,209,043 | 6/1980 | Menzel | 156/187 |
| 4,415,390 | 11/1983 | Smith | 156/187 |
| 4,566,496 | 1/1986 | Menzel et al. | 138/154 |
| 4,678,370 | 7/1987 | Allen | 138/154 |
| 4,741,795 | 5/1988 | Grace et al. | 156/344 |
| 4,995,929 | 2/1991 | Menzel | 156/187 |

FOREIGN PATENT DOCUMENTS

| | | | |
|---|---|---|---|
| 0040534 | 10/1986 | Australia . | |
| 0129244 | 7/1985 | Japan | 156/293 |
| 0103127 | 5/1987 | Japan | 156/187 |
| 0005677 | 9/1987 | PCT Int'l Appl. . | |
| 0398009 | 9/1933 | United Kingdom | 138/150 |

Primary Examiner—Michael W. Ball
Assistant Examiner—Steven D. Maki

[57] ABSTRACT

A method and means of slip control for helically wound pipes wherein the pipe is formed by helically winding a strip of plastics material and the edges of the convolutions of the strip are interconnected, wherein a slip-control member applied to the interconnected edges of the convolutions of the strip is arranged to be withdrawable progressively from the pipe to allow slip linearly between the interconnected edges of the convolutions of the pipe when torque is applied to the pipe.

14 Claims, 5 Drawing Sheets

SLIP CONTROL FOR HELICALLY WOUND PIPES

This invention relates to slip control for helically wound pipes and in particular it relates to pipes formed of a plastics material which comprise a strip helically, sometimes referred to as spirally, wound with adjacent edges interconnected.

In U.S. Pat. No. 4,995,929 and Australian Patent Application No. PH 05111 dated Mar. 19, 1986 International Publication No. WO87/05677 by the same Inventor, a system was described in which a helically wound pipe was fed into a conduit such as a sewer line which was to be relined and the helically wound pipe was then progressively expanded to a larger diameter to engage the wall of the conduit being lined. Alternatively the helically wound pipe was formed over a conduit and the larger diameter of the pipe then reduced to cause the helically wound pipe to fit neatly to the conduit being over-wound. In that specification a number of ways for achieving the result were discussed, including a fracturable sealing tape over the join, and release means moved through the pipe.

One of the problems associated with this process is to initially lock the wound pipe at the winding diameter and then to positively unlock the pipe progressively to allow for a controlled diameter change. The adhesive or locking means applied to the helically joined edges was described to be of such a form as to allow the interengaging edges to slide one relative to the other when a diameter change was required but this invention relates to releasing means which during initial winding allow the join to be locked against slip but, when required, the lock is released to allow slip in a controlled sequential manner.

The invention thus relates to the provision of a lock means to maintain the helically formed pipe at the required diameter during the initial winding and to then positively control the unlocking of the convolutions of the strips forming the pipe to allow for the desired diameter change. The various forms of lock which are discussed herein relate among other things to the use of adhesive tape which can be mechanically withdrawn, the provision of an interference fit by including a releasing element at the join, the re-design of the profile to include a double lock (with the one lock becoming the releasing element), and the provision of friction-creating shape in the releasing element itself. Associated with the locking mechanism may be re-design of the profile to allow a steeper gradient between the wound and expanded diameters.

The invention thus relates to a method of providing a form of lock, which can subsequently be removed in a progressively controllable manner to allow slip to occur progressively along the pipe.

The invention can conveniently be brought into effect in a number of ways and according to one form, for instance, an adhesive tape can be applied internally or externally to the tube over the join at the edges of the convolutions as it is being formed in the winding apparatus, but when the helically wound tube has reached the required length, for instance between manholes, the adhesive tape is progressively removed to allow expansion of the tube to the required diameter in a progressively controlled manner. Removal of the tape can be achieved in a number of ways, and according to one form, the tape is applied at the pipe forming machine end, tape being subsequently removed at a rate selected to be proportional to the profile input rate so that a change of diameter occurs progressively along the pipe.

An adhesive tape may also form another function, for instance if the tape is applied externally to the tube it could also be used to transport a sealant or grout. Thus when the tube is expanded in say a relining application the sealant will be pressed against the conduit being repaired and spread to so form a method of interrupting the spiral path around the helically wound pipe, which is formed between the ribs of the strip.

Another form of mechanical locking device is to introduce a locking element between the interengaging edges of the helical tube. Such an element could consist of an elongated slip control member formed from a suitable material which member may be embossed to provide longitudinal friction such as forming a series of interference fit segments, elongated slip control member being progressively removed in a controlled manner to allow the tube to progressively expand.

The elongated slip control member will for the sake of brevity generally be simply referred to as the "slip control member".

Associated with the requirement to lock and unlock the helically wound tube is the need to control accurately the gradient between the original wound diameter and the final expanded diameter. A steeper and therefore more closely controlled gradient can be achieved by designing the profile such that expansion and contraction chambers are included in the profile itself, one such form is to have at least one rib hollow. The hollows so formed allow the profile to flex laterally and radially. Such a profile allows a steeper gradient between the wound and expanded diameter with the gradient assuming a more step like appearance rather than a smooth slope. The effect is to reduce the radial loads on the interengaging profile joint, providing a greater margin of safety.

The invention thus comprises a method of slip control to effect a diameter change in a pipe formed by helically winding a strip preferably formed of a plastics material and interconnecting adjacent edges of the convolutions of the strip, characterised by positioning a slip-control member preferably at the interconnected edges of the convolutions of the strip, and progressively withdrawing the slip control member from contact with the strip to allow slip between the interconnected edges of the convolutions of the strip.

The means of the invention to allow a diameter change comprise a pipe formed by helically winding a strip of plastics material and interconnecting the edges of the convolutions of the strip characterised by a slip-control member applied to the interconnected edges of the convolutions of the strip, the slip control member being arranged to be withdrawable progressively from the pipe to allow slip between the interconnected edges.

From the foregoing it will be realised that the invention can be applied in many ways, but to enable the principle involved to be fully understood, methods and apparatus for carrying out the invention will be described with reference to the accompanying drawings in which:

FIGS. 3, 4, 5 and 6 a hollow rib is shown but this is not always essential. In FIG. 7 the slip control member is disposed in a hollow rib.

Figure 1:
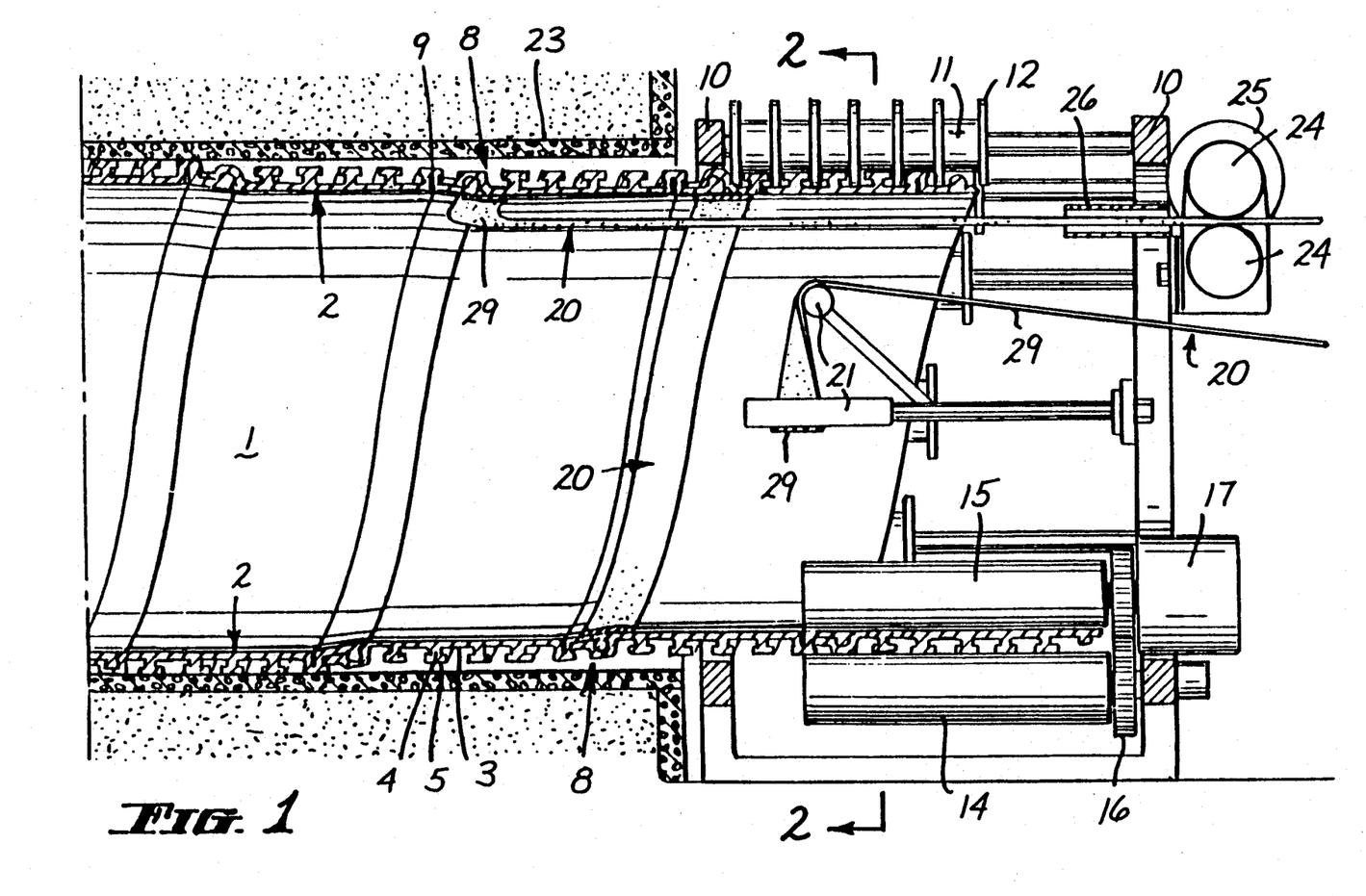
FIG. 1 is a somewhat schematic longitudinal section of one end of a conduit showing a ribbed helically wound tube therein which is being expanded by removing a locking tape which forms the slip control member while the winding machine continues to extend the pipe, the torque generated by the machine causing the pipe to expand as the end distant from the winding machine is held against rotation.
Figures 2, 3, 4, 5, 6, 7:
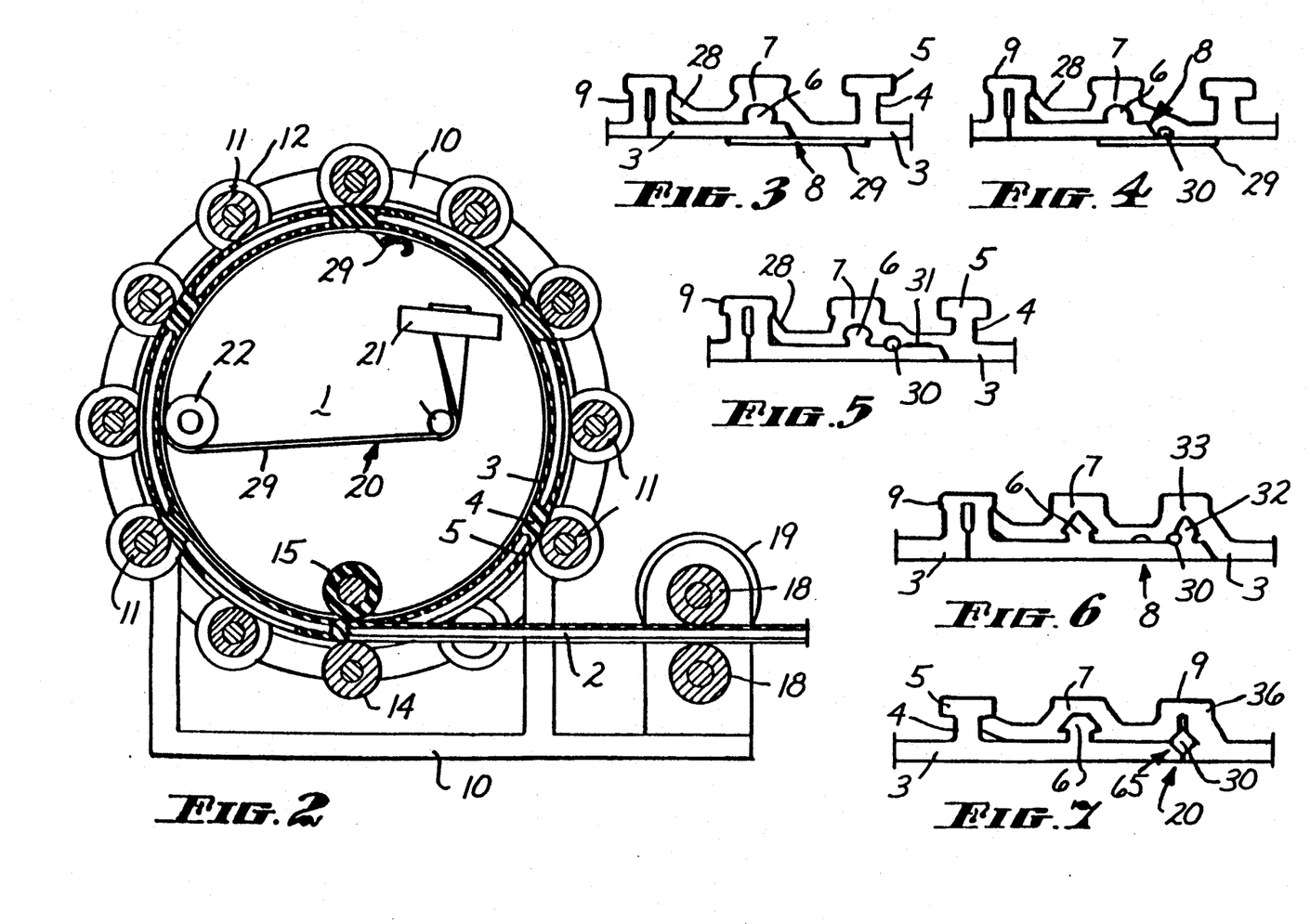
FIG. 2 is a transverse section on line 2—2 of FIG. 1.
FIG. 3 is an end elevation of portion of a join of the edges of a strip when helically wound into a pipe, showing a removable adhesive tape used as the slip control member.
FIG. 4 is a similar view to FIG. 3 but including a wire or cord as the slip control member adapted to cut the adhesive strip at the join when the slip control member in the form of the wire or cord is pulled out of the join when slip is required.
FIG. 5 is a view of a join similar to FIG. 4 but instead of using an adhesive strip, a wire or cord is used as the elongated slip control member this exiting through a part of the overlap strip which has been joined by an adhesive.
FIG. 6 shows a join which has a double lock with a slip control member in the form of a wire or cord arranged to cut a first lock which is joined by various means to the strip to prevent slip but when severed allows slip.
FIG. 7 shows a join in which the slip control member is a wire or cord locks the join against slip, the wire or cord which is adapted to be progressively withdrawn to allow slip.

Referring first to FIGS. 1 and 2, the pipe 1 is wound from a strip 2, the convolutions of which will be seen particularly in FIG. 1. The strip comprises a base 3 and a series of ribs 4 having expanded ends 5, joining being effected by a bead 6 and a socket 7 in a manner already known, the joining edges of the convolutions of the strip being designated 8.

The machine comprises a pair of rings 10 which support a series of rollers arranged as an annulus, the rollers 11 of the annulus being ribbed at 12 to engage in the contours between the ribs 4 of the strip 2 to accurately position the convolutions for the interengaging of the overlapping bead 6 and socket 7 of the strip 2. A hollow rib 9 may be included.

The strip entering the annulus 11 of rollers is pressed to the first convolution of the strip by a joining roller 14 and a pressure roller 15 which are connected by gear means 16 and are driven by a motor 17.

The strip 2 is fed to the annulus of rollers 11 by feed rollers 18 driven by a motor 19, being synchronised with the joining roller 14 and pressure roller 15 to maintain the strip 2 at the correct tension between the feed rollers 18 and the joining roller 14 and pressure roller 15.

The adhesive tape which forms the slip control member 20 is fed from a spool or other supply source and passes over guides 21 and is pressed on to the inner surface of the tube 1 by an applicator roller 22 to extend over the overlapping edges of the strip 2 after the edges are joined by the joining roller 14 and the pressure roller 15, this adhesive strip then preventing slip between the convolutions, thus allowing the pipe 1 to be projected into the conduit 23 which may be a sewer line or the like which is to be lined.

The tube 1 is thus maintained at its selected formed diameter until the required length has been projected.

When the pipe 1 is to be expanded, the end which is distant from the winding machine has the slip control member 20, in the form of the adhesive tape, pulled from the pipe 1 for a determined distance and the freed end is expanded by relative rotation between the convolutions which can now slip one on the other as force is applied.

The slip control member 20 is now joined to a lead if required and engaged between a pair of stripping rollers 24 which are driven by a motor 25 at a rate such that the slip control member 20 is disengaged progressively from the pipe 1 as the winding machine feeds in the strip 2 to compensate for the added strip 2 required for the tube as it is enlarged.

The adhesive tape is steadied through a guide 26.

While in the illustration the stripping rollers 24 are disposed at the winding machine end of the assembly, it will be realised that they could be positioned at the other end of the pipe 1, or a take-up device could traverse the tube from the distant end to the winding machine end as will be later described herein.

It is also to be understood that the invention is applicable to helically wound pipes 1 which are previously wound and taken to the site where the pipe is to be expanded, which can be achieved by winding a longer tube, then rotating one end relative to the other while controlling the position of expansion of the tube by suitable progressive control means. The pipe 1 can be reduced by winding oppositely.

When cord of nylon or metal or a wire forms the slip control member 20 this is wound into a groove between two contiguous edges of the convolutions of the strip the cord or wire may have a series of diameter changes which engage similar changes in the groove in the pipe 2, and therefore when the slip control member is in position the contiguous edges of the convolutions are locked firmly together so that the production of a pipe and its forward projection continues without there being any possibility of expansion of the pipe.

Referring now to FIGS. 3 to 7 of the drawings, which show somewhat schematically in end elevation junctions between the edges of a strip as they exist when such a strip is helically wound and the adjacent edges of the convolutions are interconnected so as to form a tube.

FIG. 3 shows the junction as used particularly as shown in FIG. 1 and shows the strip 2 consisting of the base 3 on which are the plurality of ribs 4 having expanded ends 9, the rib 2 near one edge forming the socket 7 into which a bead 6 forming the other edge of the strip is engaged, the rib 2 on one side being shown as a typical rib of which a series extend across the width of the strip 2 to run longitudinally thereon, the rib on the other side being a hollow rib 8 to allow some accommodation, during for instance, the expansion of the pipe to a larger diameter, this rib being engaged by the tail 28 which extends from the rib 8 which has the socket in it to give a secure interlock between the two edges which are being interconnected.

The slip control member is shown extending over the join between the convolutions of the strip 2 and is applied by using, for instance, an adhesive tape 29 which forms the slip control member 20 and can be fed onto the pipe over the junction of the convolutions as the strip is being helically wound to form the pipe 1 as shown particularly in FIG. 2.

The adhesive tape 29 prevents relative sliding movement of the bead 6 in the socket 7, but when removed, sliding between the bead 6 and socket 7 can be effected when the necessary force is applied.

FIG. 4 shows a similar arrangement but the slip control member 20 is a combination locking wire 30 or cord shown disposed between the wall of the pipe 1 and an adhesive tape 29, the wire 30 cutting the adhesive tape 29 when slip is required.

FIG. 5 shows the wire 30 or cord embedded at the join in such a manner that it prevents sliding of one edge in relation to the other, which may be achieved by using a serrated or roughened or plastic coated wire 30 or by applying an adhesive 31 to thereby ensure that the overlapping between the overlapping parts of the strip at the join parts are appropriately locked together until such time as adjustment is required between the edges, whereupon the wire or cord is pulled out of position to sever the adhesive 31 to leave the two edges free to slide one in relation to the other.

In the form shown in FIG. 6, a further bead 32 and socket 33 are shown, the first bead 6 being slideable in the socket 7 when engaged therein but the second bead 32 is locked in the socket 33 by using a bonding medium or other lock such as formed by ultrasonic welding so as to prevent movement of the bead 32 in the socket 33 but again the wire or cord 30 is used which can be pulled out by severing the end of the strip 2 to release the second bead 32 from the edge on which it is formed and thus destroy the locking action of this second bead 32 in its socket 33 by cutting it away from the part of the base on which it is formed.

The form shown in FIG. 7 again uses a construction in which a wire 30 or cord is used as the slip control member 20 but in this case the slip control member 20 is positioned during the winding of the strip 2 into a pipe 1. The wire 30 which forms the slip control member 20 is engaged in a hollow rib 36 similar to the rib 8 but positioned at the inter-engaged edges of the convolutions so that the edges are held against slip, one relative to the other.

This can be sealed in position by a bonding medium or can as shown be twisted or can be corrugated or roughened in such a manner that when in position it prevents slip between the two interconnected edges of the convolutions but when pulled out of position allows the necessary sliding to enable diameter adjustment of the pipe to be effected, this form having the advantage that there is no necessity to use a hollow rib as the rib 36 which accommodates the wire 30 or cord can be in the nature of a hollow rib 36 as shown to allow the necessary adjustment when the locking member is withdrawn.

This, thus has the advantage of forming both the lock which prevents sliding of one edge on the other edge when in place but when removed allows the necessary adjustment during expansion or contraction of the pipe to a different diameter. Because of the form of the socket 36 which accommodates this wire 30, the interior of the tube still retains a smooth surface.

Figures 8, 9, 12:
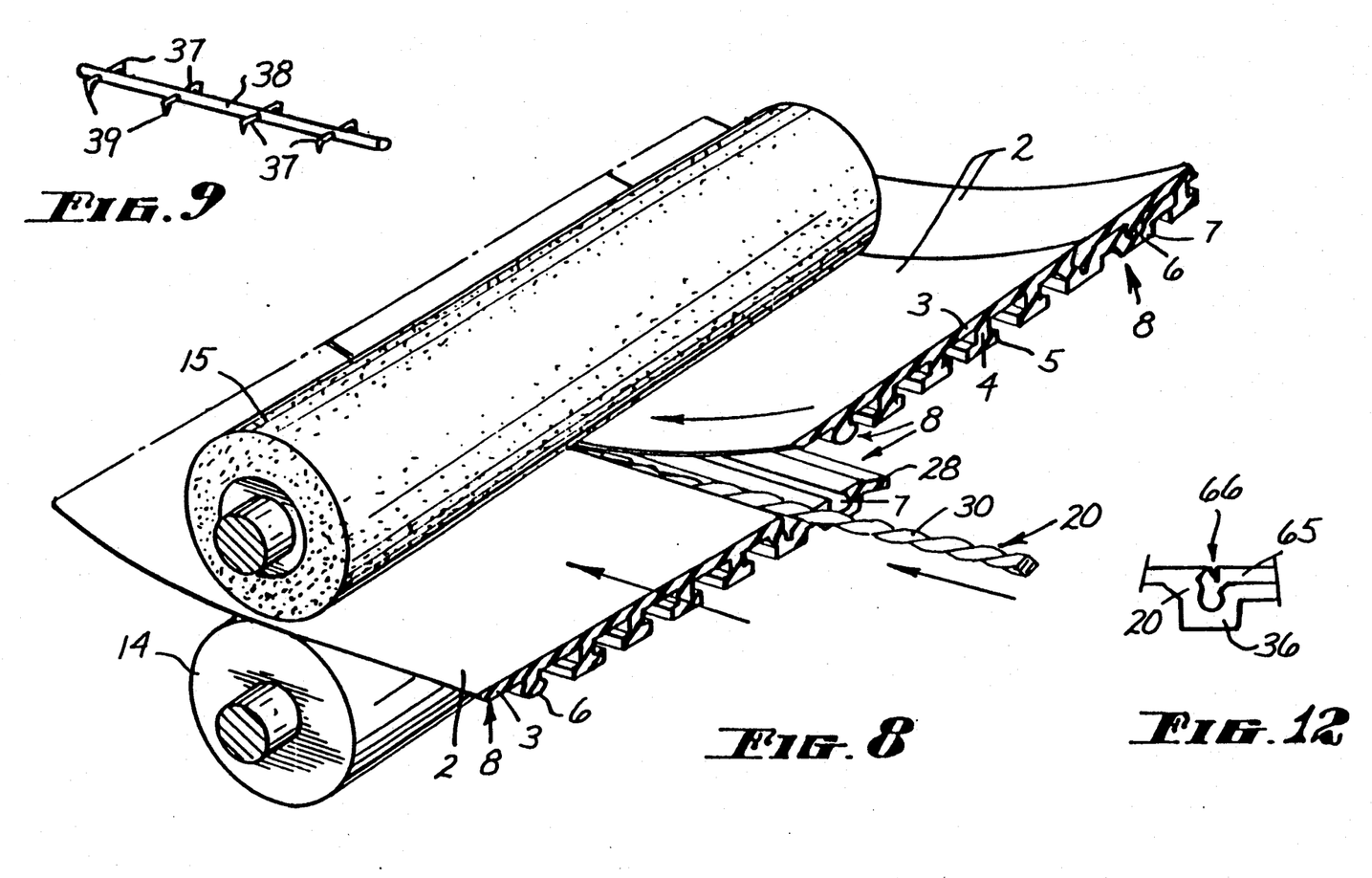
FIG. 8 is a schematic sectional perspective view of part of the winding machine showing how the join of, for instance the strip of FIG. 7 can be effected, showing how the slip control member can be located during the winding of the strip when forming a pipe.
FIG. 9 shows a different form of slip-control member having staples to prevent slip.
FIG. 12 shows a modification of the slip control member of FIG. 8.

Referring to FIG. 8 it will be seen that this shows the general method used in forming helically wound pipe from ribbed strip of a plastics material according to which a pipe 1 is formed by joining together the convolutions of the strip 2 by use of a pair of rollers, one being the joining roller 14 and the other the pressure roller 15, the joining roller 14 preferably being a metal roller and the pressure roller 15 having at least a surface formed of a resilient material, the rollers 14 and 15 being positioned to force the incoming part of the strip 2 into overlapping relationship with the convolution of the strip which has just been formed as a pipe, the illustration showing how the slip control member 20 in the form of the wire 30 can be fed into the join to be firmly embedded in the join between the two joined edges of the adjacent convolutions.

Figure 10:
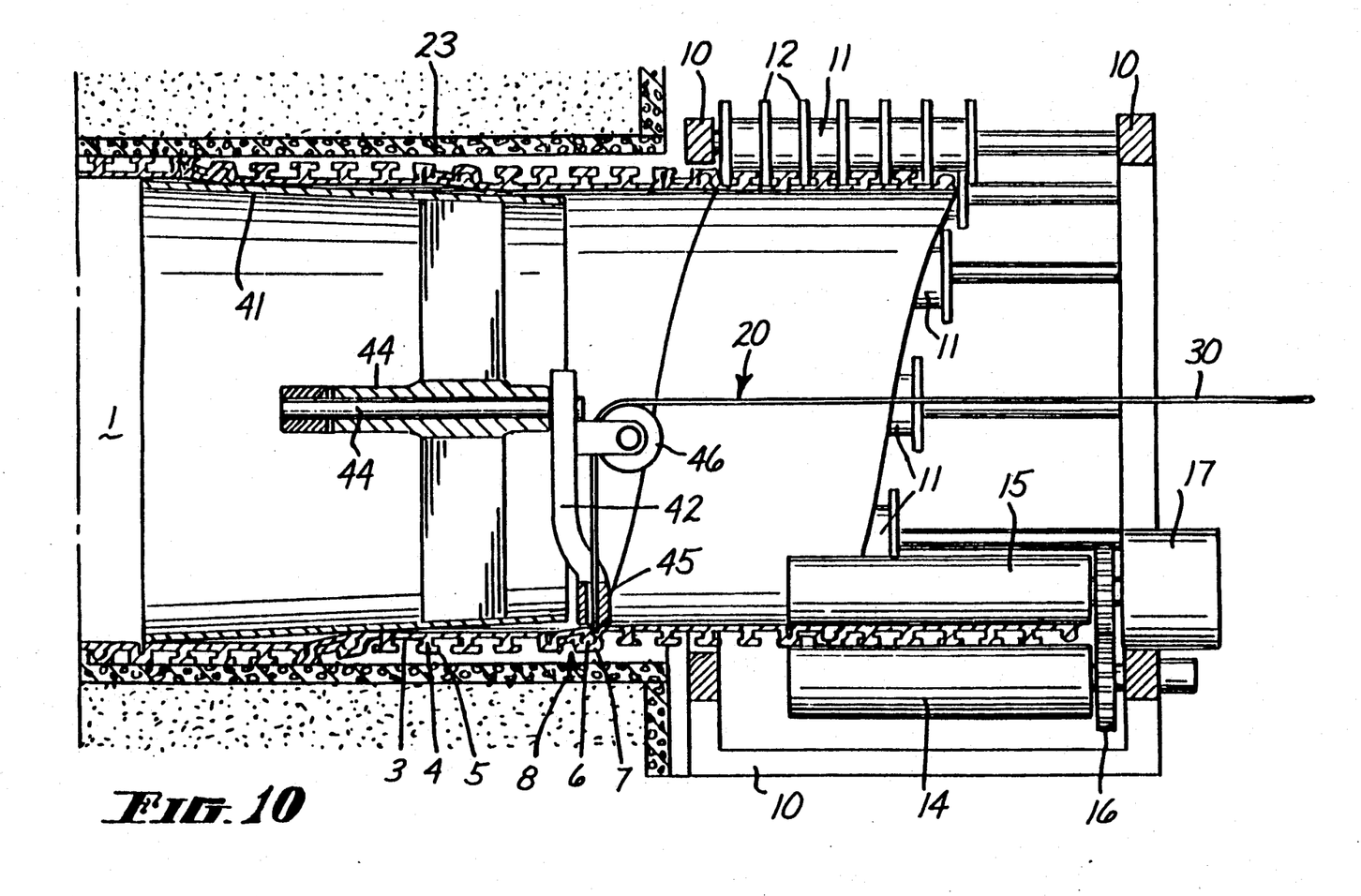
FIG. 10 is a general longitudinal section of a helically wound tube being expanded into a conduit using a wire or cord as the slip control member in place of the adhesive strip, including a release control mechanism which regulates the release position of the slip-control member in the expansion section of the helically wound tube.
Figure 11:
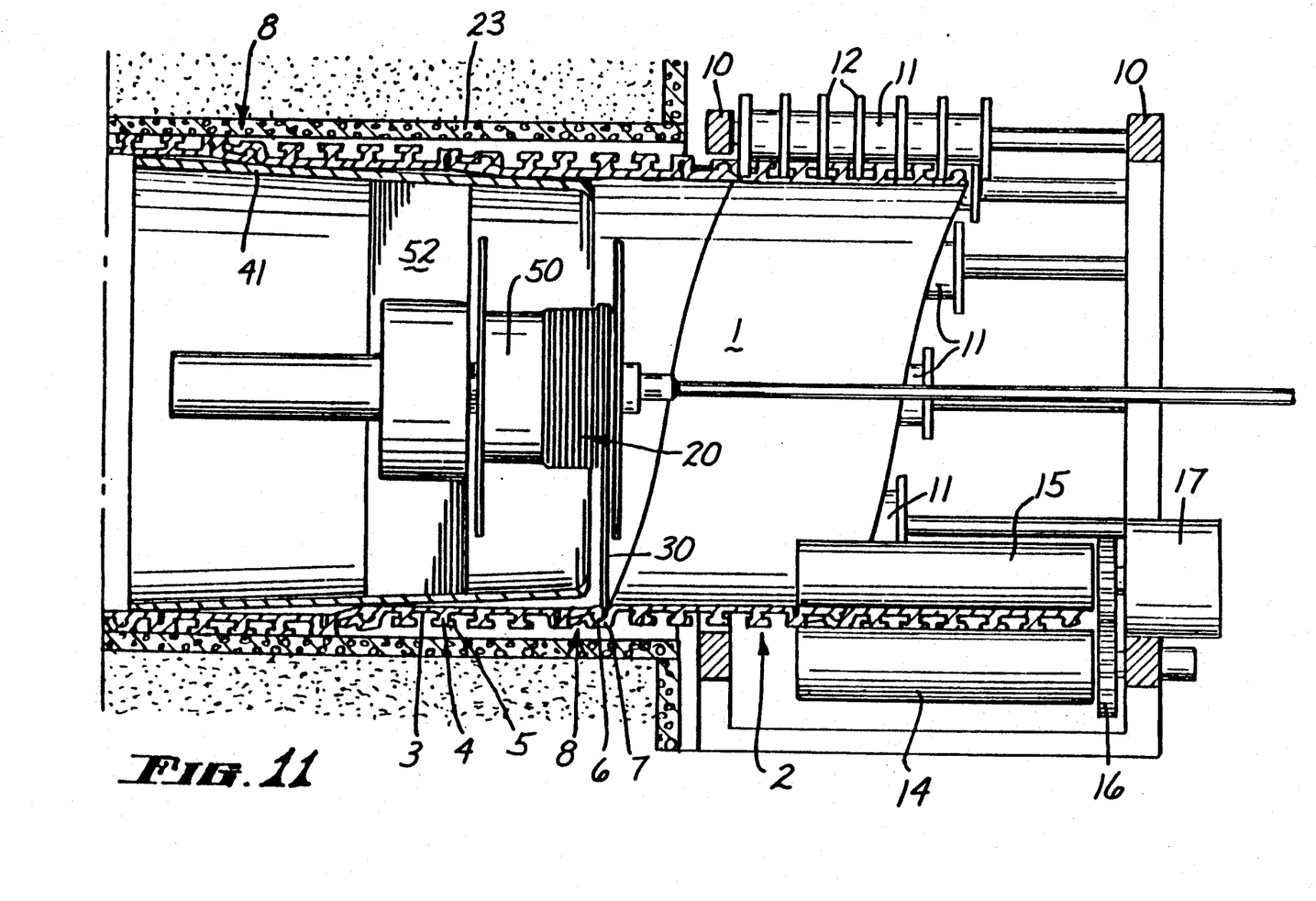
FIG. 11 is a view similar to FIG. 10 but showing a different device for removing the slip control member when slip is required.

The wire 30 is shown as a member of rectangular cross-section which is twisted to provide as it were a series of locking sections which can embed into the overlapping edges of the strip 2 to form the necessary anti-slip member, this form applying particularly to the method illustrated in relation to FIGS. 10 and 11 where the slip control member in the form of a wire or cord which is progressively withdrawn from the join to remove the slip prevention factor from the join and to then allow the join to slip as is required during expansion or contraction of the diameter of the tube.

In FIG. 9 is shown how such a slip control member 20 can be varied, in this case it being in the nature of a series of stapling members 37 joined to a continuous member 38, which can be applied to the inside of the pipe at the joint to straddle the joint between the convolutions, this elongated slip control member 20 being locked by penetration of the prongs 39 into the plastics material of the pipe 2.

Referring now to FIG. 10 which shows how the slip control member can be withdrawn, a truncated conical sensor 41 has a swinging arm 42 supported in it as shown, which conical member is inserted into the pipe 1 at the expansion locality, the elongated locking member 20 being in the form of a wire 30 or cord guided by the swinging arm 42 so that, as the slip control member 20 is pulled to remove it from the pipe 1, the swinging arm 42 is pulled around circularly to follow the convolutions of the strip 2 to progressively allow slip between adjacent convolutions, but this action also drawing the conical member 41 forwardly so that the expansion is effectively controlled in a progressive manner as the conical member moves forward and the slip control member 20 is progressively withdrawn.

To support the swinging arm 42 the truncated conical member 41 has at its forward end a bearing member which journals a shaft 44 positioned coaxially in the conical sensor 41 and has the swinging arm 42 at its forward end, the arm having a guide 45 through which the slip control member 20 passes, the swinging arm 42 also supporting a draft means 46 or a guide to cause the slip control member 20 to draw the truncated conical member 41 forwardly.

It will be realised that using an arm as depicted in FIG. 10, twist may be applied to the slip control member 20 as it is drawn out of the pipe 2 but normally this can be taken care of by the resiliency of the slip control member 20, or instead of using a pair of rollers as shown in FIG. 1 where the adhesive tape 29 is being pulled away from the pipe, grippers or the like can be used which act alternately to pull the elongated slip control member 20 forwardly but allowing some twist of the slip control member.

It will of course be realised that the pull to the slip control member 20 can be effected in any manner such as by winding the member on to a spool driven to withdraw the slip control member at the correct rate and this can be mounted to counter any twisting action on the slip control member 20 if that is required.

FIG. 11 shows a modification of a device shown in FIG. 10 in which the slip control member 20 is again in the form of a wire 30 or cord but in this case is withdrawn by rotation of a spool 50 driven for instance by a hydraulic motor 51 mounted on a member 52 engaging the conical truncated sensor 41 which allows the spool 50 to be projected forwardly only when the required expansion is being effected, this member being in that case shown being drawn forwardly by a hydraulic line 53 or the like.

It will of course be clear, particularly having reference to the earlier cited prior art specification WO87/05677 relating to the EXPANDA PIPE, that other means of moving such a device along the inside of the pipe are available and it would for instance be possible to use a self-propelling unit such as is described in the referred to prior art specification and to have sensor means so that it moves forwardly to control the progressive diameter change of the pipe and at the same time effect a withdrawal of the slip control member in synchronism with the progressive expansion.

The shape of the slip control member can be varied but a cord or wire or tape can be used which is serrated or stepped or otherwise formed or is sealed in by an adhesive to prevent slip between the two members between which the groove is defined while this slip control member is in position, and only after it is removed can slip occur to allow the tube to be expanded, the conical member ensuring that the correct forward progression of the expansion takes place and also forming a gauging means to ensure that the expansion is correctly controlled to result in the pipe being effectively placed in position and of the required final diameter.

It will be realised that this method of controlling the expansion can apply to the various forms of the strip illustrated in the invention and it will also be realised that the method of control can be varied and in some cases the conical member may not be required as the flexing of the tube during expansion can control the progressive release of the convolutions to allow the necessary slip to occur.

It should also be appreciated that interconnection of the convolutions can be effected in various ways and includes such embodiments as a flexible portion or an insert between the strip at the location where the adjacent convolutions are joined.

Throughout this specification where similar parts are referred to, the same reference numeral is applied.

The expression "wire or cord" includes any elongated member which can be applied to the interengaged edges and subsequently removed and includes a removable member or section forming part of the wound part which can be pulled away. For instance the slip control member 20 can be formed as part of the strip 2 as shown in FIG. 12 but arranged to be pulled away similarly to the strip 8 of FIG. 8. The slip control member 20 can be moulded as part of the end of the strip at 65 but linearly scored at 66 to be torn off during processing when slip is required. The slip control member 20 can be of a high tensile form but moulded as an attachment to the strip 2.

The slip control member 20 can be a member formed of a plastics material but can have a reinforcing such as a wire 30 or cord embedded in it to enhance its strength.

Although the invention has generally been described as using a plastics material, metal or a combination of metal and plastics can be used, or the strip can be reinforced by metal or fibreglass or similar tension enhancing means.

The slip control member 20 need not necessarily follow the helical form of the winding as illustrated, provided the arrangement allows progressive release along the pipe as expansion is required.

The claims defining the invention are as follows:

I claim:

1. The method of slip control of a helically wound pipe comprising the steps of winding a strip into helical form with a winding machine wherein the helical form includes a plurality of convolutions of the strip, joining adjacent edges of the convolutions of the strip to form interconnected edges to allow slip of one edge on a second edge, applying a slip control member to the interconnected edges to prevent slip of the one edge on the second edge, continuing the winding until a desired length of pipe is formed, then holding an end of the pipe remote from the winding machine while progressively withdrawing the slip control member toward the winding machine as the winding continues, to expand the pipe by slip at the interconnected edges of the convolutions of the strip where the slip control member has been removed and controlling the rate of withdrawal of the slip control member to be related to the rate of input of the strip to the winding machine.

2. The method of slip control of a helically wound pipe according to claim 1 wherein the slip control member includes adhesive tape, applying the adhesive tape over the interconnected edges of the convolutions of the strip to prevent slip between the edges, and the step of withdrawing includes withdrawing progressively the adhesive tape from the interconnected edges.

3. The method of slip control of a helically wound pipe according to claim 1 wherein the slip control member includes a linear wire or cord engaged between the interconnected edges of the convolutions of the strip to prevent slip between the edges and the step of withdrawing includes withdrawing progressively said wire or cord to allow the interengaged edges to slip one in relation to the other.

4. The method of slip control of a helically wound pipe according to claim 1 wherein the interconnected edges of the convolutions of the strip are interconnected by at least a first and second pair of beads and a first and second pair of sockets, the first bead and first socket being in slipping relationship, the second bead and second socket being locked together in non-slip engagement, the slip control member is positioned adjacent to second bead and the step of withdrawing includes severing the second bead by progressively withdrawing the slip control member from the interconnected edges.

5. The method of slip control of a helically formed pipe according to claim 1 wherein the slip control member forms part of one edge portion of the strip.

6. The method of slip control according to claim 1 wherein the slip control member comprises an adhesive tape applied to the interconnected edges, and a linear wire or cord positioned to cut the tape longitudinally when the linear wire or cord is progressively withdrawn and said step of withdrawing includes pulling the wire or cord to cut the tape.

7. The method of slip control according to claim 1 wherein the interconnected edges of the convolutions of the strip are interconnected by at least a bead on said one edge and a socket on said second edge adapted to slide on said bead, and a second bead on said one edge and a second socket on said second edge adapted to lock the interconnected edges against sliding one on the other, the slip control member including a wire or cord arranged to progressively cut one of said second bead and said second socket and said step of withdrawing includes progressively cutting said one of said second bead and said second socket to allow slip between the interconnected edges of the convolutions of the strip.

8. The method of slip control according to claim 1 wherein the step of withdrawing includes providing means to withdraw the slip control member which comprises a truncated conical sensor adapted to sense expansion of the pipe, a swinging arm positioned to rotate about the axis of the conical sensor, and draft means on the arm to be engaged by the slip control member and pulling on the slip control member to move the arm and truncated conical sensor forward and to withdraw the slip control member.

9. The method of slip control according to claim 1 wherein the step of withdrawing includes providing means to withdraw the slip control member which comprises a spool rotatable to withdraw the slip control member and rotating the spool to withdraw the slip control member.

10. The method of slip control according to claim 9 wherein the spool is rotatably mounted on a truncated conical sensor and including moving the sensor longitudinally in the pipe as the pipe is expanded.

11. The method of slip control according to claim 1 wherein the slip control member comprises an extending member having staples to engage the interconnected edges of the pipe to prevent slip.

12. The method of slip control according to claim 1 wherein the slip control member is formed as part of one edge portion of the strip but shaped to be progressively torn from the strip when slip is required between the interengaged edges of adjacent convolutions of the strip.

13. The method of slip control according to claim 12 wherein the slip control member includes a wire or cord to reinforce the slip control member.

14. The method of slip control of a helically wound pipe according to claim 1 wherein the slip control member is applied by the winding machine and the step of withdrawing is carried out by part of the winding machine.

* * * * *